July 25, 1933.  W. H. DE LANCEY  1,920,066
AIR SEPARATOR
Filed May 31, 1932  2 Sheets-Sheet 2
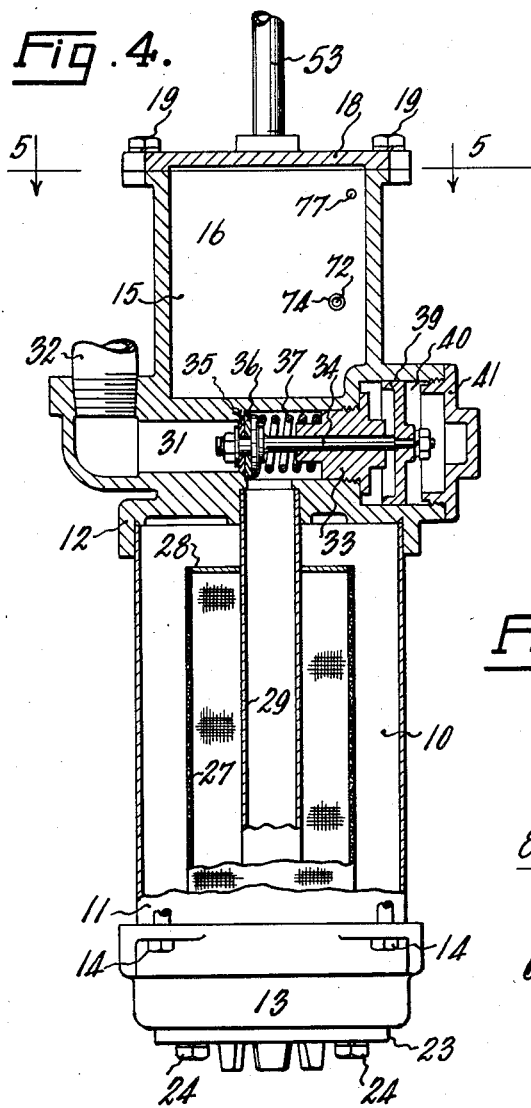
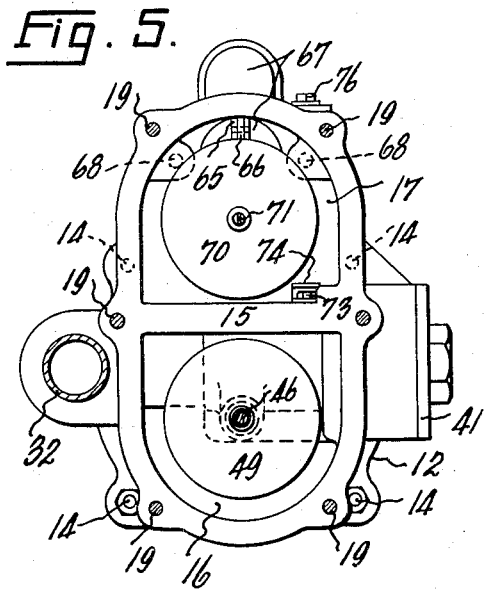
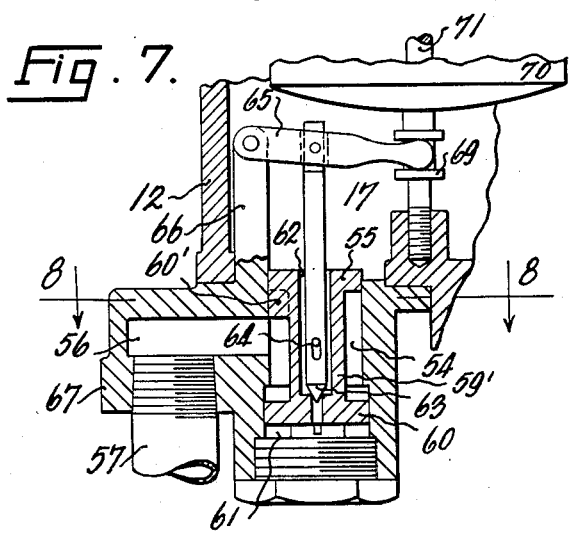
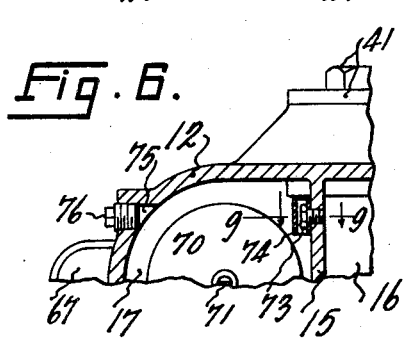
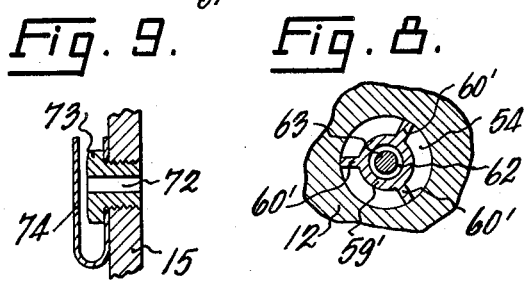
INVENTOR
WARREN H. DE LANCEY
BY Chapin & Neal
ATTORNEYS Patented July 25, 1933

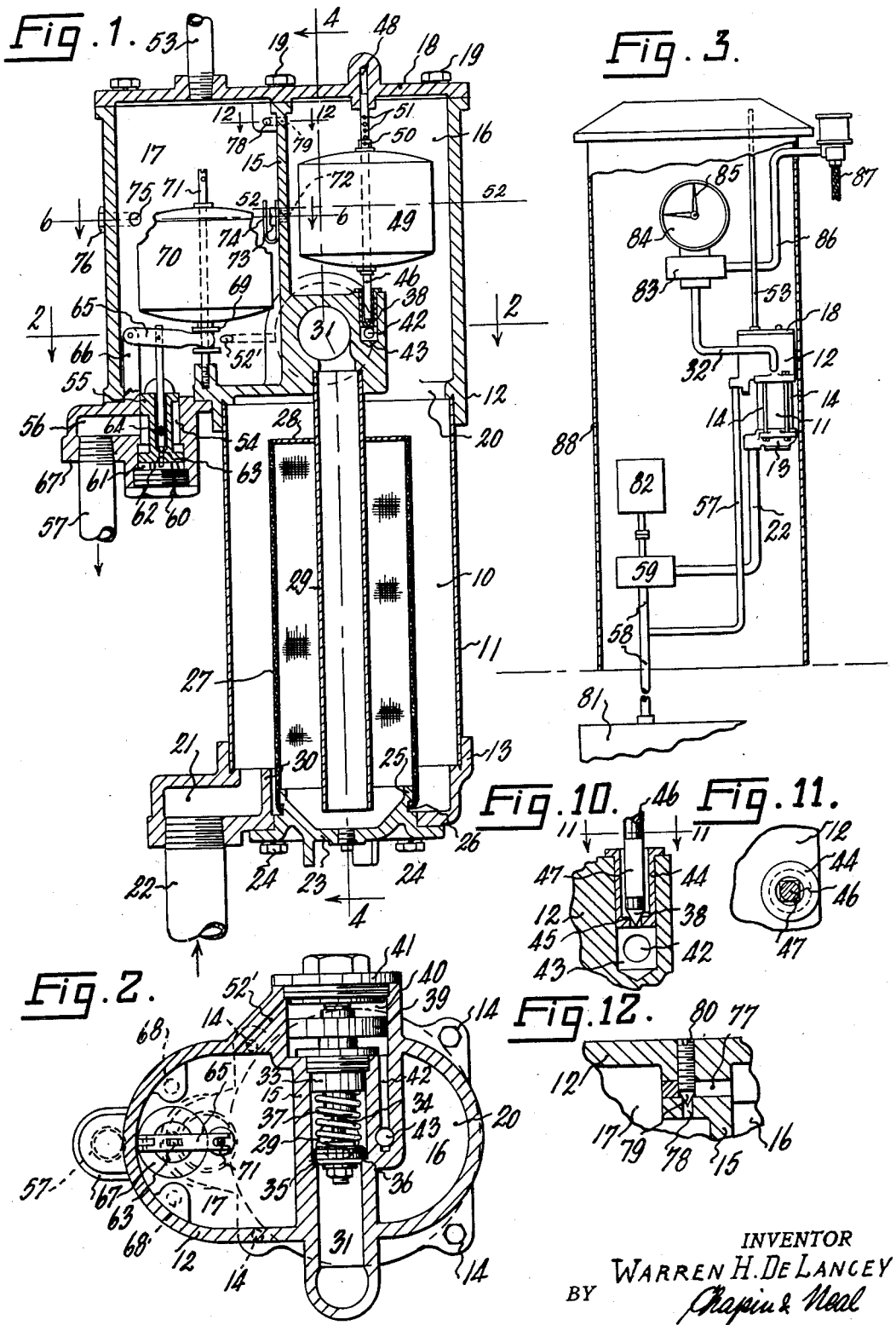

1,920,066

UNITED STATES PATENT OFFICE

WARREN H. DE LANCEY, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS

AIR SEPARATOR

Application filed May 31, 1932. Serial No. 614,314.

This invention relates to improvements in gas and liquid separators, such for example as are suitable for use in freeing air from gasoline in connection with dispensing apparatus of the present day type, in which the liquid is under substantial pressure during operation of the apparatus.

In apparatus of this type, many of the prior art separators are not effective during operation of the apparatus, while liquid is being pumped under substantial pressure, because pressure of the liquid in the separator holds the air escape valve closed. Such valve can open only after cessation of pumping of the liquid and then only after the pressure in the separator has been relieved. Separators of this sort will serve during the starting period of the apparatus to bleed the liquid discharge line of air but, once the air valve is closed, it will be held closed by the pumping pressure until the apparatus stops. It follows that, if there is an air leak in the system, air will accumulate in the separator and under certain conditions may escape from the separator and pass through the meter, causing inaccurate measurement of the liquid dispensed.

An alternative form of separator, better adapted perhaps for this type of dispensing apparatus, provides a valveless but restricted air outlet. Liquid as well as air can escape through such outlet and accordingly, it must be relatively small to avoid excessive loss of liquid. Therefore, this type of separator, although effective during operation of the pumping apparatus to vent air from the system, is not effective to eliminate large amounts of air such as might result from a bad leak in the system.

The present invention recognizes that the separators, at present available, are not effective under all conditions and that, while they may eliminate small quantities of air entering the system because of small leaks therein, they cannot satisfactorily cope with bad leaks in the system, wherefore air may accumulate in the separator and be discharged therefrom.

This invention has for its principal object to provide in an air separator, means for preventing discharge of liquid therefrom except when the separator is filled with liquid up to a predetermined level, and for preventing the discharge of air through the liquid discharge conduit under all conditions of normal operation. Unless the air has been eliminated from the separator within satisfactory limits, the dispensing apparatus cannot be operated because the liquid discharge outlet of the separator will be closed.

The invention is characterized by means, set in operation by an excess accumulation of air in the separator, to close the liquid discharge outlet of the separator and stop the dispensing operation. In other words, operation of the apparatus is automatically prevented in the event that air is leaking into the system at a rate greater than that at which the separator can get rid of the air.

Other objects and advantages will appear as the detailed description proceeds and will be pointed out in the appended claims.

The invention will be disclosed with reference to the accompanying drawings, in which:

Fig. 1 is a sectional elevational view of an air separator embodying my invention;

Fig. 2 is a sectional plan view thereof taken on the line 2—2 of Fig. 1;

Fig. 3 is a small scale elevational view showing the exterior of the separator and showing also the manner in which it is applied to a meter type liquid dispensing apparatus;

Fig. 4 is a cross sectional view of the separator, taken on the line 4—4 of Fig. 1;

Fig. 5 is a sectional plan view taken on the line 5—5 of Fig. 4;

Fig. 6 is a sectional plan view taken on the line 6—6 of Fig. 1;

Fig. 7 is a fragmentary sectional view of the drain valve mechanism shown in Fig. 1, but drawn to a larger scale;

Fig. 8 is a sectional view taken on the line 8—8 of Fig. 7;

Fig. 9 is a sectional view taken on the line 9—9 of Fig. 6;

Fig. 10 is an enlarged fragmentary view of the pilot valve;

Fig. 11 is a sectional plan view taken on the line 11—11 of Fig. 10; and

Fig. 12 is a fragmentary sectional plan view taken on the line 12—12 of Fig. 1.

Referring to these drawings; the separator includes a main chamber 10 (Fig. 1), formed within a cylindrical barrel 11 which is clamped between upper and lower heads 12 and 13, respectively, by tie bolts 14 (Figs. 2, 3 and 4). The upper head 12 is hollow and the space therein is subdivided by a partition wall 15 (Figs. 1 and 5) into two compartments 16 and 17. Both these compartments are closed at their upper ends by a cover 18 (Fig. 1), secured to head 12 by cap screws 19. The compartment 16 is in constant communication with chamber 10 by way of an opening 20 in head 12 but this head prevents direct communication of chamber 10 with chamber 17.

The lower head 13 (Fig. 1) has an inlet passage 21 for liquid under pressure and such passage is shown as connected to a pipe 22 for supplying such liquid. The lower head also has a central removable section 23, secured by cap screws 24. This section has an upstanding flange 25 having a circumferential groove 26 in its exterior surface. The separator element, which consists of a perforated brass cylinder 27 forming a screen, is carried by the section 23, the lower end of the cylinder being crimped into said groove. The upper end of the screen is closed by an imperforate annular member 28, through the center of which a discharge pipe 29, secured to and depending from head 12, passes. The pipe 29 extends downwardly inside screen 27, terminating closely adjacent the base of chamber 10. Liquid under pressure, entering the lower part of chamber 10 is deflected upwardly by a baffle 30 and, in order to reach the discharge pipe 29, it has to pass through screen 27 which restrains the passage of air bubbles. Only liquid free from air bubbles can reach pipe 29 in normal operation. Such air as is thus separated, and also liquid rise through opening 20 into the float chamber 16.

Referring now to Figs. 2 and 4, the discharge pipe 29 intersects a horizontally-disposed, cored passage 31 formed in head 12. The outer end of such passage is upturned and threaded for connection to a discharge pipe 32. The other end of passage 31 is closed by a plug 33 which serves to slidably support a valve stem 34. Passage 31, at a point intermediate its ends, is formed with a seat 35 with which a valve 36, fixed to one end of stem 34, cooperates. A spring 37, acting between plug 33 and valve 36, tends to hold the valve to its seat 35 and, as will be obvious from the drawings, the valve is also held closed by the pressure existing in separator chamber 10. In other words, valve 36 has to open against such pressure and in a direction opposite to that of the liquid flow in passage 31.

For opening the valve 36, power means actuated by fluid pressure are provided. The pressure, existing in chambers 10 and 16, is utilized, under the control of a pilot valve 38 (Fig. 1) to actuate a piston 39 (Figs. 2 and 4) which is fixed to the stem 34 of valve 36 and is slidably mounted in a cylinder 40 formed in head 12. The cross sectional area of the piston 39 is considerably larger than that of valve 36 and large enough so that the total pressure acting on it to open the valve is greater than the total liquid pressure plus the pressure of spring 37, which acts on the valve with a tendency to close it. The inner end of cylinder 40 is closed by the plug 33 and the outer end by a removable plug 41. A passage 42 (Fig. 2) formed in head 12 extends from the inner end of cylinder 40 in a horizontal direction paralleling the passage 31 and connects at its inner end with a vertical passage 43 near the base thereof. This passage 43 opens at its upper end into the chamber 16 and inset into its upper end is a bushing 44 (Fig. 10) having at its lower end a seat 45 for needle valve 38. The stem 46 of this valve has an enlarged portion 47 of modified square cross section (see Fig. 11). The rounded corners of the portion 47 engage the bore of bushing 44 as a guide for the valve. The upper end of the stem 46 is guided in a hole 48 in cover 18 (Fig. 1). Intermediate its ends, the stem 46 carries a float 49 which may be fixed thereto in various positions of vertical adjustment by a pin 50 passed through any one of a vertical series of holes 51 in the stem.

When the liquid under pressure rises to a sufficiently high level in chamber 16, say above the line 52—52 shown in Fig. 1, the float will rise and lift valve 38, admitting liquid under pressure to the inner end of cylinder 40 (by way of passages 43 and 42) and thus force piston 39 outwardly to open valve 36 and allow discharge of liquid from the separator chamber 10. When air accumulates in the upper part of chamber 16 to an extent sufficient to cause float 49 to fall back to the level 52—52, the pilot valve 38 will cut off the supply of liquid to cylinder 40 and the valve 36 will be closed by the spring 37 and the liquid pressure acting on it. The outer end of cylinder 40 is connected by a passage 52' (Fig. 2) to the chamber 17 which is vented to the atmosphere by means of a pipe 53, threaded into cover 18. The piston 39 has a sufficiently loose fit in cylinder 40 so that liquid may pass by it from the inner to the outer end of cylinder 40 and escape by way of passage 52' into chamber 17.

This chamber 17 forms a trap for liquid and is provided with means for intermittently returning liquid back to the suction side of the pumping means. This chamber, in its lower wall, has an outlet passage 54 normally closed by a disc valve 55, and such passage connects with a lateral passage 56, leading to the drain pipe 57, which as shown in Fig. 3 leads to the suction pipe 58 of a pump 59. Integrally connected by a sleeve 59' to valve 55 (Fig. 7) is a piston 60, slidably mounted in a cylinder 61. A passage 62 extends axially through valve 55, sleeve 59' and piston 60 and opens into the lower end of cylinder 61. Sleeve 59' carries guide vanes 60' (Fig. 8) to slidably engage the wall of passage 54. Intermediate its ends, the passage 62 has a seat with which a needle valve 63 cooperates. The stem of this valve does not closely fit passage 62 (Fig. 8) so that space is left for liquid to pass to cylinder 61 when valve 63 is open. Such stem also has a pin and slot connection 64 with the sleeve 59'. The upper end of the stem of valve 63 is pivotally connected to a lever 65 at a point intermediate the ends of the latter. This lever is pivoted at one end to an upstanding arm 66, formed as an integral part of a fitting 67 which is removably secured to member 12 by cap screws 68 (Fig. 5) and which carries the valve 55 and piston 60. The inner end of lever 65 is forked and this forked end is engaged in a clutch collar 69 fixed to a float 70, which slides on a stationary guide rod 71, fixed in head 12.

The upper face of valve 55 is subject to atmospheric pressure but the lower face thereof is subject to a less pressure, while pump 59 is in operation due to its connection to the suction side of the pump. When liquid accumulates in chamber 17 to an extent sufficient to raise float 70, the valve 63 will be lifted and liquid will be admitted by way of passage 62 to the lower end of cylinder 61, whereby the piston 60 will be forced upwardly and raise valve 55, thus allowing liquid to escape from chamber 17 into the drain pipe 57 by way of passages 54 and 56. The area of the piston, being larger than that of valve 55, will raise the latter against the pressure existing in chamber 17. As the liquid is drained from chamber 17 down to a predetermined level, the pilot valve 63 will close and cut off the supply of motive fluid to cylinder 61, whereby the pressure of liquid in chamber 17 acting on the upper face of the valve will move valve 55 downwardly into closed position. The piston 60 fits loosely in its cylinder 61 so that the liquid will pass by it from the lower to the upper end of the cylinder during the closing of valve 55.

The chamber 16 is provided with one or more vent openings leading into the chamber 17. As shown herein, two such vent openings are provided at different levels and either one or the other, or both, of these openings may be used as desired according to the manner in which it is desired to have the separator operate. One of these openings, marked 72 is provided in the partition wall 15 at a point below the buoyancy line of float 49 or below the level 52—52 shown in Fig. 1. This opening, being below the normal liquid level, may be made relatively large as shown in Fig. 9. As shown, opening 72 is formed as an axial passage in and extending through a cap screw 73 which is threaded into wall 15 and acts to hold in place a baffle 74, herein shown as a U-shaped piece of sheet metal. This baffle deflects the stream of liquid emitted under substantial pressure from passage 72 and prevents such stream from impinging on float 70 and interfering with its freedom of sliding movement. An opening 75 (Fig. 6) is provided in the upstanding wall of head 12 at a point opposite passage 72 to allow the drilling and tapping of the hole into which cap screw 73 is threaded. Such opening, after having served its purpose, is closed by a plug 76.

As an alternative to vent 72 or for use supplementary thereto, a second vent is provided in the partition wall 15 at a point above the normal level of liquid in chamber 16. As indicated in Fig. 1 and best shown in Fig. 12, two intersecting and right angularly disposed passages 77 and 78 are provided to interconnect the chambers 16 and 17. At the intersection of such passages is a suitable valve, such as the needle valve 79 formed on the inner end of a screw 80, threaded into head 12 and accessible from outside the head for adjustment. As shown, this valve is closed, so that passage 72 alone functions but valve 79 may be opened to various degrees to allow constant escape of air at a regulated rate if and when desired. When passages 77 and 78 are used, the other passage 72 is not necessarily essential and it may be closed if desired, by removing the cap screw 73 and replacing it with a plug.

The separator described is intended for use with a meter-type gasoline dispensing apparatus, such as is conventionally indicated in Fig. 3, but it is of course, capable of other uses and the invention is not limited to the one specific use herein disclosed. In Fig. 3, gasoline is drawn up by a suitable pump 59 through a suction pipe 58 from an underground storage tank 81 and forced by such pump through pipe 22 into the separator. The pump 59 is usually power driven, as by an electric motor 82 which may be controlled in any suitable manner as will be well understood by those skilled in the art. Gasoline leaves the separator by way of pipe 32 and passes to and through a suitable meter 83, the measurements of which are indicated on a dial 84 by a pointer 85.

Liquid leaves the meter by way of a pipe 86 and passes to a flexible delivery hose, shown in part at 87, which is usually provided at its delivery end with a normally closed delivery valve (not shown). The apparatus usually is housed in, except for hose 87, by a suitable casing 88.

The operation of the apparatus will next be described. Considering first the initial operation of the apparatus, when the entire system is filled with air, the pump 59 is started and the suction pipe 58 is evacuated, eventually causing liquid to rise therein from tank 81. At the same time, the pump creates pressure to force air out of pipe 22 and chamber 10. The valve 36 will be held closed and air will be driven out of the system through the vent, such as 72, and into chamber 17 from which it escapes through pipe 53. This action continues until liquid, entering the separator chamber 10 and float chamber 16, rises to a level slightly above the line 52—52, whereupon float 49 will rise and open pilot valve 38. Then fluid pressure is admitted through passages 43 and 42 to the inner side of cylinder 40. This forces piston 39 outwardly and opens valve 36. On the initial operation air will be expelled from pipe 29, passage 31, pipes 32 and 86 and hose 87, until the system is entirely filled with liquid up to the delivery end of the hose. Subsequently, the discharge passages from valve 36 to the delivery end of the hose will remain filled with liquid. Having initially driven all air from the system except for a small volume which remains trapped in the upper end of chamber 16, the apparatus is in readiness for normal operation in dispensing metered quantities of liquid.

The apparatus can be operated in various ways. It may be operated with the needle valve 79 closed. Then the only vent for the separator chamber is by way of the passage 72, which lies below the normal level of liquid in chamber 16. It will be appreciated that when liquid is being pumped under substantial pressure, the volume of air contained in that part of chamber 16 above the level of passage 72, will be compressed into a much smaller volume so that liquid can and does rise above the line 52—52 and raise the float 49 and cause opening of discharge valve 36. With this fact in mind, it will be seen that there is no outlet available for air. Air, if present in the gasoline will be separated therefrom by the screen 27, through which the air bubbles cannot readily pass. Such bubbles will rise in chamber 10 outside screen 27 and pass into the upper end of chamber 17. But there is no means for getting rid of this air while the apparatus is in operation. If there is a bad leak in the system, air will accumulate so rapidly in chamber 16 that the liquid level will be depressed to or below the line 52—52, causing the pilot valve 38 to close and thereby allowing discharge valve 36 to be closed by its spring 37. The effective operation of the apparatus will thus be stopped. Before the operator can again dispense gasoline, he must stop the pump. On cessation of pumping, the pressure in chambers 16 and 17 becomes equalized and air will escape through passage 72 until a condition of atmospheric pressure exists in the chambers 16 and 10. Then the pump may again be started but, if the leak is a bad one, operation of the apparatus will soon be stopped again. If the leak is small, the apparatus may be operated for longer periods but with any leak, the apparatus will eventually be stopped by the accumulation of air under this plan of operation.

Another plan of operation makes use of the air vent 77—78, the control valve 79 of which may be set to allow the constant discharge of air at a small rate of flow. For example, it is known that the screen 27 will effectively separate air from the gasoline at various rates but not in excess of a predetermined maximum rate. Provided that the air content is not in excess of certain percentage, the separator will be effective. The valve 79 may be set to allow air to escape at a certain rate up to the capacity of the screen 27 to separate it effectively. That is, the valve 79 may be set to prevent the valve 36 from closing when there is a small air leak, which experience shows will do no harm. Then when a bigger leak exists, the valve 36 will be closed as in the first described plan of operation, to stop the apparatus because the air will accumulate faster than it can pass the small vent opening around valve 79.

There will, of course, be a constant discharge of liquid (in normal operation) through passage 72 but such liquid is received in trap chamber 17 and intermittently returned by the automatic operation of the valve 55 to pipe 57 which conveys the liquid back to the pump. Each time the pump is stopped, liquid will drain back to the level of passage 72.

It will be obvious that the apparatus will work if the passage 72 is plugged provided valve 79 is opened. Thus, either of the two vents may be used or both can be used together. The apparatus will also operate if both air vents are closed, except that it would be necessary in the first operation to vent the air from the system. This can be done by opening valve 79 and, after the air has been removed from the separator, closing such valve.

It is to be noted that valve 36 is purposely arranged to open against the pressure in the chamber 10 and that such pressure tends to close the valve. No amount of pressure, acting directly on the inner face of valve 36, can open it. This prevents any possibility of operation of the valve by air pressure, as might be possible under certain conditions if the valve opened in the direction of liquid flow against a spring. Presence of liquid in the upper part 16 of the separator is necessary to cause opening of valve 36. Only liquid can raise float 49 and thus it is insured that the separator will be filled with liquid up to the predetermined level before liquid can be dispensed from the apparatus. Another advantage of the valve 36 is that it permits the relief of pressure in the hose and discharge piping. When the pump stops, liquid from the pipe 32 can open valve 36 and pass back into the separator until the pressure in the hose is relieved. Because of spring 37, the pressure in the hose will not be decreased to atmospheric but any excess pressure therein will be relieved. For example, if the hose is exposed to the hot sun for a long period, the expansion of the liquid in the hose will cause a heavy pressure to be built up therein and this can be relieved as disclosed.

The invention has been disclosed herein, in an embodiment at present preferred, for illustrative purposes but the scope of the invention is defined by the appended claims rather than by the foregoing description.

What I claim is:

1. A separator, comprising, a container provided with a main separating chamber and above said chamber two auxiliary chambers, the first of which is in constant communication with the main chamber and the second of which has constant but restricted communication with the first, means for venting the second chamber to the atmosphere, a liquid drain for the second chamber, a separating element in said main chamber, a liquid inlet and a liquid outlet from said main chamber communicating therewith on opposite sides of said element, a valve controlling said liquid outlet and held closed by the fluid pressure in the main chamber, fluid pressure actuated means for opening said valve against said pressure, a float in the first auxiliary chamber and means operable by the rise and fall of said float to admit or cut off the flow of fluid under pressure to said valve opening means.

2. A separator, comprising, a container provided with a main separating chamber and above said chamber two auxiliary chambers, the first of which is in constant communication with the main chamber and the second of which has constant but restricted communication with the first, means for venting the second chamber to the atmosphere, a liquid drain for the second chamber, a separating element in said main chamber, a liquid inlet and a liquid outlet from said main chamber communicating therewith on opposite sides of said element, a valve controlling said liquid outlet and held closed by the fluid pressure in the main chamber, fluid pressure actuated means for opening said valve against said pressure, a float in the first auxiliary chamber and means operable by the rise and fall of said float to admit or cut off the flow of fluid under pressure to said valve opening means, a valve controlling said drain outlet, and a float in the second auxiliary chamber to control by its rising and falling movements the opening and closing, respectively, of said drain valve.

WARREN H. DE LANCEY.